United States Patent [19]
Adams et al.

[11] Patent Number: 5,324,915
[45] Date of Patent: Jun. 28, 1994

[54] MICROCONTROLLER CONTROLLED INPUT PROTECTION

[75] Inventors: John T. Adams, Minneapolis; T. Michael Tinsley, Coon Rapids, both of Minn.

[73] Assignee: Honeywell Inc., Minneapolis, Minn.

[21] Appl. No.: 467,060

[22] Filed: Jan. 18, 1990

[51] Int. Cl.⁵ .............................................. H05B 1/02
[52] U.S. Cl. .................................... 219/494; 219/501; 219/481; 219/492; 361/88
[58] Field of Search ............... 219/497, 494, 501, 485, 219/481, 501, 505, 508, 506; 361/79, 88

[56] References Cited

U.S. PATENT DOCUMENTS

| | | | |
|---|---|---|---|
| 4,109,134 | 8/1978 | Van Herten | 219/505 |
| 4,122,719 | 10/1978 | Carlson et al. | 219/497 |
| 4,935,607 | 6/1990 | Kudwell et al. | 219/494 |
| 4,983,811 | 1/1991 | Oppor et al. | 219/508 |
| 5,038,020 | 8/1991 | Kim | 219/501 |

Primary Examiner—Mark H. Paschall
Attorney, Agent, or Firm—Kinney & Lange

[57] ABSTRACT

A method and apparatus provide input protection in a system having a controller which monitors a controller terminal for at least one monitor period. The controller terminal is coupled for bi-directional operation. The controller terminal is set to an output configuration for at least a portion of the time that the controller terminal is not being monitored by the controller.

56 Claims, 3 Drawing Sheets

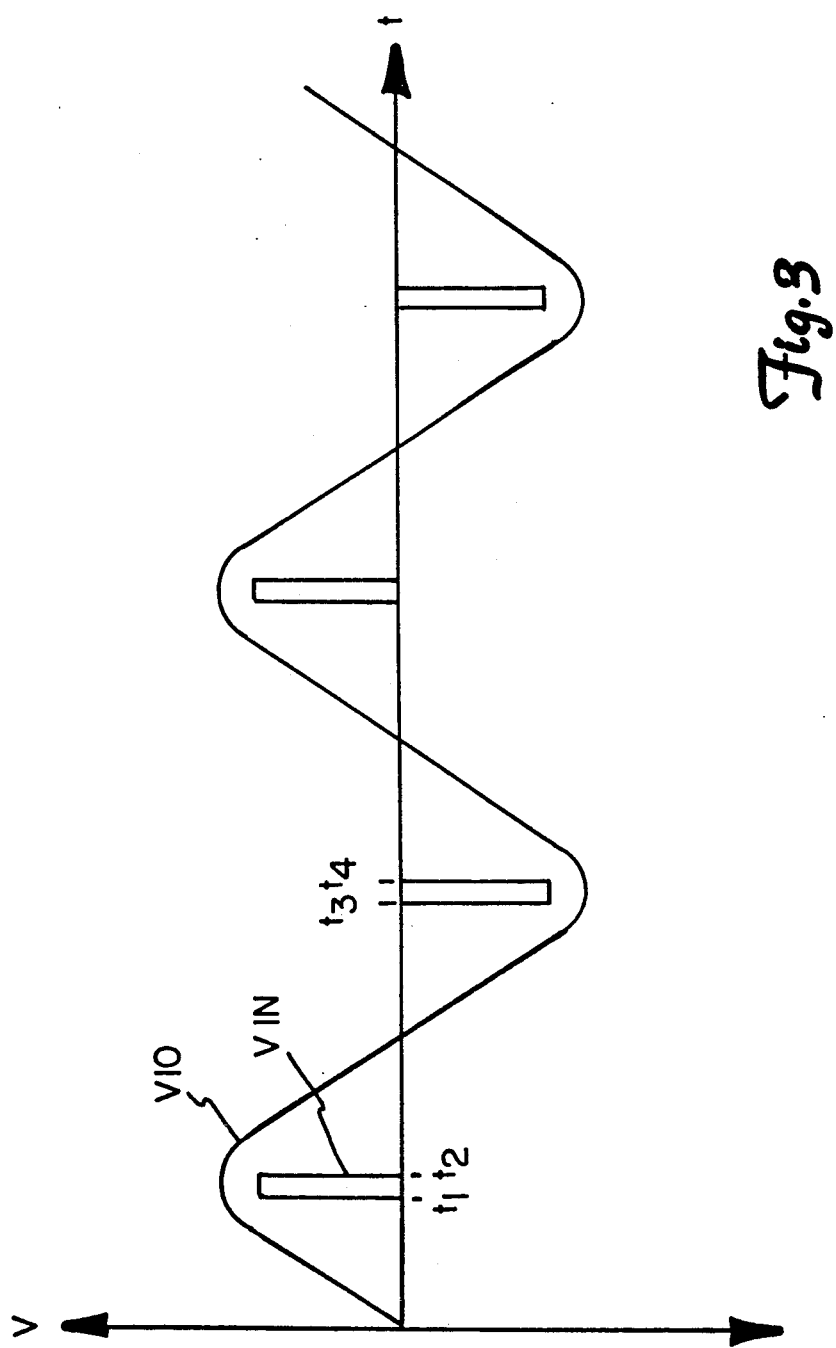

MICROCONTROLLER CONTROLLED INPUT PROTECTION

BACKGROUND OF THE INVENTION

The present invention pertains generally to the operation of a controller. More particularly, the present invention pertains to a method and apparatus for operating a controller to provide the controller with input protection.

Microcontrollers and microprocessors are presently in wide use. They are used to control many systems, such as heating systems. Part of the function of a controller in controlling a heating system is to monitor input signals which represent system conditions in the heating system. Based upon the signals monitored, the controller commands various output signals which, in turn, alter control of the heating system. For example, in some heating systems pressure switches are monitored, the flame in the heating system is verified, and other safety conditions are also monitored. Based upon these conditions, the controller may shut down the heating system or operate it in various modes as the conditions require.

In any case, it is generally necessary to provide input terminals or input ports to the controller with protection against transients and voltage spikes caused by, among other things, static discharge. This protection generally takes the form of a diode and resistor network which is implemented with discrete components externally to the controller integrated circuit (IC) chip. In addition, some microcontroller and microprocessor IC chips also have internal protection which takes the form of a similar diode and resistor network.

There are several reasons why these protection techniques are either ineffective or inadequate. First, present applications of microcontrollers and microprocessors require them to be very small in size. This requires chip manufacturers to continually downsize the die of microcontroller and microprocessor IC chips. In downsizing the die, the chip manufacturers are required to reduce the size of the resistors and diodes used for input protection on the die. Similarly, the external diodes and resistors used for protection are also required to be very small. Reducing the size of the input protection resistors and diodes results in a corresponding decrease in effectiveness as input protection.

Second, the input ports on the microcontroller or microprocessor are often coupled to a device, such as a thermostat, which is physically set or controlled by an operator. When the operator touches the control, a transient in the range of approximately 25 kilovolts, caused by static discharge, can be applied to the input of the microcontroller or microprocessor. However, typical resistors used in the internal and external protection techniques described above generally break down when 300–400 volts are applied across them. Hence, the internal and external protection techniques are inadequate to handle a transient in the range of 25 kilovolts.

For these reasons, there is a continuing need to provide adequate and effective techniques for protecting microcontrollers and microprocessors and other circuitry against transients.

SUMMARY OF THE INVENTION

A method and apparatus provide input protection in a system having a controller with a controller terminal. The controller terminal is coupled for bi-directional operation. The controller is programmed to configure the controller terminal as an output when the controller is not monitoring the controller terminal. Thus, the configuration of the controller terminal provides input protection when it is not being monitored.

BRIEF DESCRIPTION OF THE DRAWINGS

FIG. 3 is a graph of the input voltage applied to an input terminal, and the actual voltage appearing at an input node of the control system of the present invention plotted against time.

DETAILED DESCRIPTION OF THE PREFERRED EMBODIMENTS

Figure 1:
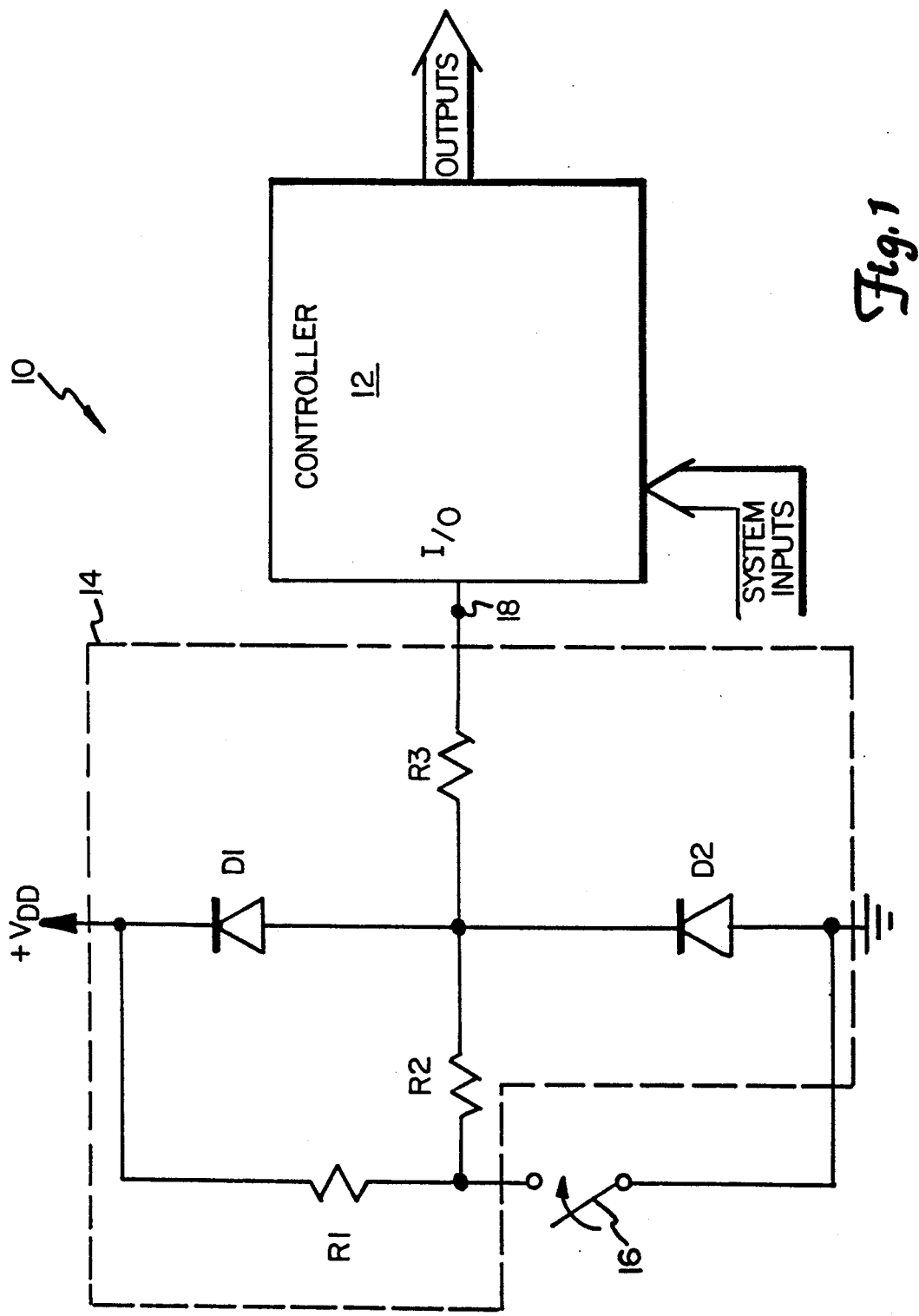
FIG. 1 is a schematic diagram of an input protection circuit in the control system of the present invention.

FIG. 1 is a diagram of control system 10 showing controller 12 in block form and external input protection circuit 14 in schematic form. Control system 10 comprises controller 12, input protection circuit 14 and operator select switch 16 (switch 16). Input protection circuit 14 is comprised of resistors R1, R2 and R3 and diodes D1 and D2 and is coupled to input/output (I/O) terminal 18 of controller 12. Although the present invention can be implemented on multiple controller terminals for multiple system inputs, only one terminal (I/O terminal 18) is illustrated for convenience.

In this preferred embodiment, control system 10 is a heating control system, controller 12 is a heating system controller for controlling a heating system, and switch 16 is an operator select switch which is set by an operator in the field to indicate a certain operating parameter to controller 12. Controller 12 monitors and verifies various heating system parameters at its input terminals and I/O terminals and commands various outputs based on those parameters. For example, select switch 16 indicates to controller 12 a portion of the model number of the heating mechanism being controlled so that controller 12 adjusts its operation accordingly. Hence, on power up, controller 12 reads the state of switch 16 by monitoring I/O terminal 18. Based on the state of switch 16, controller 12 adjusts its operation to command certain outputs during its operation.

Input protection circuit 14 is used, in this preferred embodiment, to protect I/O terminal 18 against high voltage transients applied at switch 16 which may result, for example, from static discharge. Resistor R2 acts as a current limiting resistor impeding any transient applied at switch 16. Diode D1 clamps the voltage transient as it reaches a diode threshold voltage above supply voltage VDD. Similarly, diode D2 is provided to clamp the voltage transient as it reaches a diode threshold voltage below ground. Resistor R3 further current limits and impedes the transient.

Although input protection circuit 14 provides some protection against transients, the breakdown voltage for resistor R2 is typically in the range of 300 to 400 volts. Thus, if a 25 kilovolt transient is applied at switch 16, resistor R2 breaks down and becomes ineffective as a current limiter. Similarly, conduction of diodes D1 and D2 is not instantaneous. Therefore, if a sharp transient voltage spike is applied at switch 16, diodes D1 and D2 do not completely prevent the voltage spike from reaching controller 12 and input protection circuit 14 is ineffective and provides inadequate protection for controller 12.

In addition, resistors R1, R2 and R3 and diodes D1 and D2 of input protection circuit 14 are often comprised of discrete components. These discrete components are expensive and inefficient because they take time to assemble and occupy costly space on a circuit board. Thus, the elimination of input protection circuit 14 is desirable.

Figure 2:
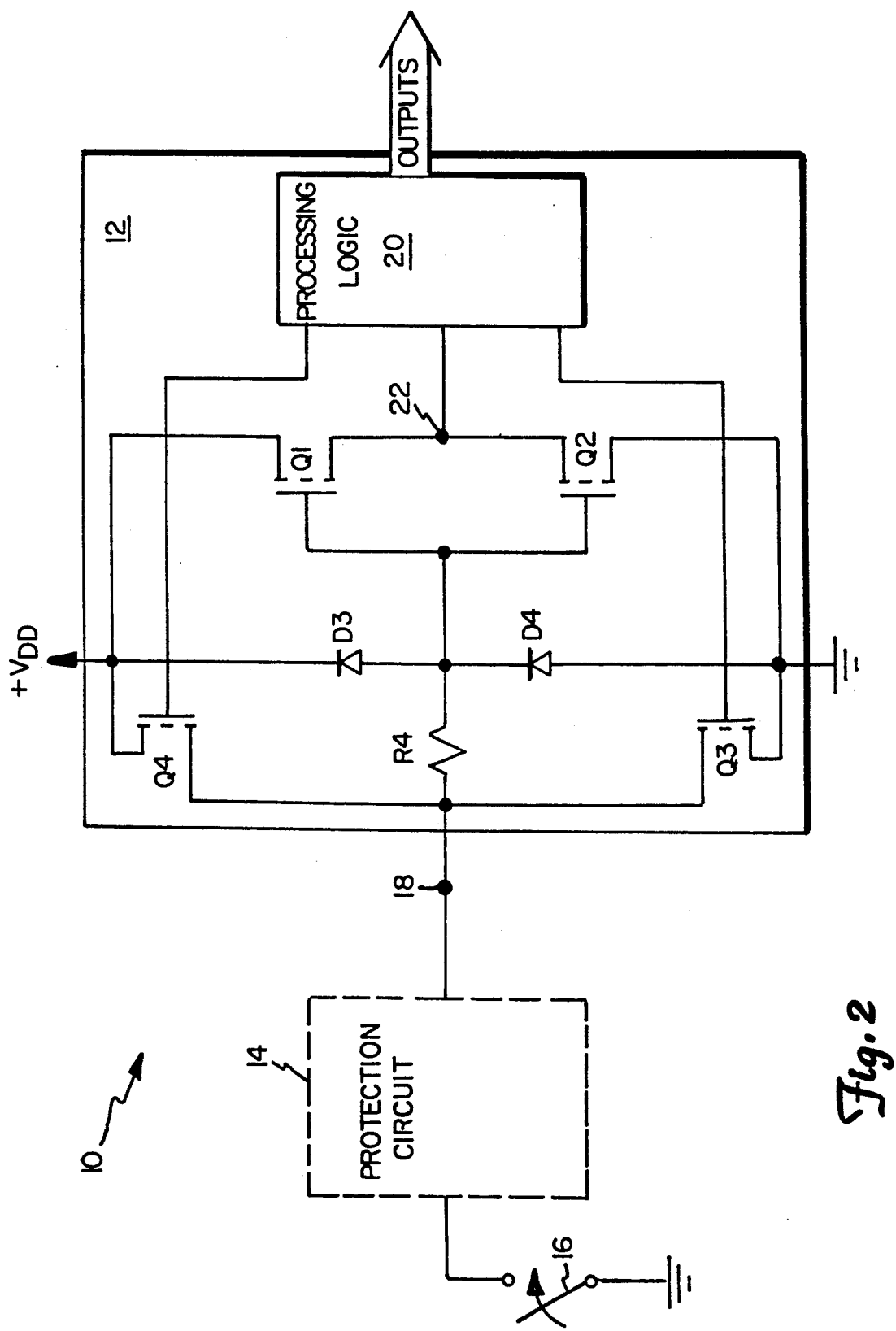
FIG. 2 is a schematic diagram of an internal protection circuit control system of the present invention.

Some embodiments of the present invention render input protection circuit 14 optional. Other embodiments provide enhanced input protection to controller 12 in addition to that provided by input protection circuit 14. FIG. 2 is a diagram of control system 10 showing input protection circuit 14 in block form and controller 12 partially in schematic form. Controller 12 includes an internal protection circuit which is similar to input protection circuit 14. The internal protection circuit includes resistor R4 and diodes D3 and D4. Also, since I/O terminal 18 is capable of operating as both an input and an output, controller 12 has an input stage which includes transistors Q1 and Q2 and an output stage which includes transistors Q3 and Q4. Controller 12 also includes processing logic 20.

To monitor the signal at I/O terminal 18 (in this preferred embodiment, the state of switch 16) processing logic 20 controls the input and output stages in a familiar manner. For example, to monitor the signal at I/O terminal 18, processing logic 20 turns off transistors Q3 and Q4. The signal appearing at I/O terminal 18 is provided to the internal protection circuit and to input stage transistors Q1 and Q2. Based upon the state of switch 16, either transistor Q1 or Q2 is turned on and the other is turned off. Processing logic 20 then monitors the signal appearing at input node 22 and commands certain outputs based on that signal.

Although the internal protection circuit provides controller 12 with some protection against high voltage transients, as with input protection circuit 14, the internal protection circuit can be ineffective and inadequate. Resistor R4 breaks down at voltages which are far lower than a typical voltage transient applied at switch 16. Similarly, the size of resistor R4 and the speed and size of diodes D3 and D4 is reduced due to the continuing pressure on IC chip manufacturers to decrease the die size of controller 12. This makes the input protection circuit in controller 12 less effective.

In order to provide additional input protection for controller 12, the present invention utilizes the output stage of controller 12. In this embodiment, the state of switch 16 is only read once, upon power up. Therefore, after the state of switch 16 is read, controller 12 no longer monitors the signal appearing at I/O terminal 18. To provide additional input protection, processing logic 20 is programmed to turn on output transistor Q3 after the state of switch 16 has been read. When Q3 is turned on, it drives the signal appearing at I/O terminal 18 to a logic low level. In essence, transistor Q3 acts as an additional resistor between I/O terminal 18 and ground. The effective resistor provided by transistor Q3 is an additional mechanism for sinking current from transients to ground.

In this preferred embodiment, where switch 16 is only read once during the operation of controller 12, processing logic 20 turns on transistor Q3 immediately after switch 16 is initially read. Thus, transistor Q3 provides additional transient protection for controller 12 against transients appearing on I/O terminal 18 throughout the remainder of the operation of controller 12.

The technique of turning I/O terminal 18 into an output and driving a logic low level can also be used where the signal appearing at I/O terminal 18 is periodically monitored by controller 12. For example, the present invention can be implemented where switch 16 is replaced with a signal representing a different heating system parameter such as a heat demand signal, a recycle limit signal, or an interlock signal. In that case, the signal appearing at I/O terminal 18 is typically a sine or square wave and controller 12 monitors the signal once every half cycle to ensure that the sine or square wave is present.

FIG. 3 is a graph showing a signal VIO (representing one of the system parameters mentioned above) applied to I/O terminal 18 as well as input signal VIN appearing at logic input node 22 plotted against time, where the technique of the present invention is implemented. In this preferred embodiment, controller 12 monitors I/O terminal 18 each half cycle to determine whether VIO is present (i.e. whether VIO is going positive and negative during successive half cycles). Controller 12 waits for a time t1 until VIO should have reached a certain voltage threshold. Then, controller 12 monitors I/O terminal 18 for a period equal to t2-t1 to determine whether VIO is above the voltage threshold. Next, controller 12 waits until time t3 when it again monitors I/O terminal 18 for a period t4-t3 to determine whether VIO has gone below a voltage threshold. Controller 12 continually monitors I/O terminal 18 once each half cycle to ensure the presence of VIO.

When the technique of the present invention is used, processing logic 20 is programmed to turn on transistor Q3 at all times except during the monitoring windows (t2-t1 and t4-t3) for each cycle. This results in the effective resistance of Q3 to ground being enabled for a large percentage of each operating cycle. For example, where VIO is a 60 Hertz sine wave and where the monitoring windows t2-t1 and t4-t3 are 50 microseconds each, transistor Q3 is turned on for over 99% of the cycle. Hence, by simply programming processing logic 20 to turn on transistor Q3 in the output stage of controller 12 when I/O terminal 18 is not being monitored, additional input protection is provided to controller 12 without using additional space and without any additional assembly time.

CONCLUSION

The present invention provides input protection to microcontrollers and microprocessors against transient signals which appear at the input terminals. By simply programming processing logic 20 to turn on transistor Q3 (thus driving I/O terminal 18 to a logic low level) while I/O terminal 18 is not being monitored, an additional resistor for sinking current is effectively provided. This additional input protection technique can be used in place of input protection circuit 14 or merely as additional input protection to controller 12.

In addition, the present input protection technique is flexible and can be used where I/O terminal 18 is not monitored by controller 12, where it is monitored only once during the operation of controller 12 or where it is periodically monitored.

Further, the technique of the present invention can be used without increasing the size of controller 12 where the terminal being monitored is configured for operation as an input and an output. Also, however, the technique can be used where the terminal is configured only as an input if one transistor (Q3) is added to the internal circuitry of controller 12 or externally.

Although the present invention has been described with reference to preferred embodiments, workers skilled in the art will recognize that changes may be made in form and detail without departing from the spirit and scope of the invention.

What is claimed is:

1. A method for providing input protection in a system having a controller with a controller terminal, wherein the controller monitors the controller terminal for at least one monitor period, and wherein the controller includes a bi-directional gate settable by the controller to an input configuration so that the controller receives an input signal, and settable to an output configuration, the controller terminal being coupled to the bi-directional gate, the method comprising:
   setting the bi-directional gate to the output configuration so that the controller provides an output signal for at least a portion of time other than during the monitor period.

2. The method of claim 1 and further comprising:
   setting the bi-directional gate to the input configuration during each of a plurality of monitor periods allowing the controller to receive and monitor the controller terminal; and
   setting the bi-directional gate to the output configuration between the monitor periods.

3. The method of claim 1 wherein the controller terminal comprises an input/output (I/O) terminal of the controller, having an input stage and an output stage connected thereto, and wherein the step of setting the bi-directional gate to an output configuration comprises:
   turning on the output stage.

4. The method of claim 3 wherein the step of turning on the output stage comprises:
   setting the output stage to drive a logic low output signal at the I/O terminal.

5. The method of claim 1 wherein a transistor is coupled between the controller terminal and reference voltage and wherein the step of setting the bi-directional gate to the output configuration comprises:
   turning on the transistor.

6. The method of claim 5 wherein the controller monitors an AC signal and further comprising:
   verifying the presence of the AC signal.

7. The method of claim 6 wherein the step of verifying comprises:
   monitoring the AC signal for one monitor period each half cycle of the AC signal.

8. The method of claim 7 wherein the step of monitoring the AC signal comprises:
   setting the bi-directional gate to the input configuration once each half cycle of the AC signal.

9. The method of claim 7 wherein the step of setting the bi-directional gate to an output configuration comprises:
   turning on the transistor between each monitor period.

10. A method for providing input protection for a system for monitoring a signal at a controller terminal of a controller, the controller terminal being coupled for bi-directional operation and being settable by the controller to an input configuration and an output configuration, the method comprising:
    setting the controller terminal to the input configuration wherein the controller receives an input signal, allowing the controller to monitor the input signal; and
    setting the controller terminal to the output configuration wherein the controller provides an output signal at least a portion of the time that the controller is not monitoring the signal.

11. The method of claim 10 and further comprising:
    periodically repeating the step of setting the controller terminal to the input configuration allowing the controller to monitor the signal during a plurality of monitor periods; and
    setting the controller terminal to the output configuration at times other than during the monitor periods.

12. The method of claim 11 wherein the controller terminal comprises an input/output (I/O) terminal having an input stage and an output stage and wherein the step of setting the controller to an input configuration comprises:
    disabling the output stage.

13. The method of claim 11 wherein the step of setting the controller terminal to an output configuration comprises:
    enabling the output stage of the I/O terminal.

14. The method of claim 13 wherein the step of enabling the output stage comprises:
    configuration the output stage to drive a logic level low output signal.

15. A method for controlling a system to provide input protection, the system having a controller which reads a signal at a controller terminal at least once, wherein the controller terminal is coupled for bi-directional operation and is settable by the controller to an input configuration and to an output configuration the method comprising:
    setting the controller terminal to the input configuration for reading the signal at the controller terminal for an input period allowing the signal at the controller terminal to be read by the controller; and
    setting the controller terminal to the output configuration so that the controller provides an output signal at the controller terminal after the input period.

16. The method of claim 15 and further comprising:
    repeating the steps of setting the controller terminal to the input configuration and setting the controller terminal to the output configuration.

17. The method of claim 15 wherein the controller terminal comprises an input/output (I/O) terminal having an input stage and an output stage and wherein the step of setting the controller terminal to the input configuration comprises:
    disabling the output stage of the I/O terminal.

18. The method of claim 17 wherein the step of setting the controller terminal to the output configuration comprises:
    enabling the output stage of the I/O terminal.

19. The method of claim 18 wherein the step of enabling the output stage comprises:
    configuring the output stage to drive a logic low output signal.

20. A method of providing a controller with input protection wherein the controller has at least one input/output (I/O) terminal settable by the controller to an input configuration an output configuration and wherein the controller sets the I/O terminal to the input configuration and reads the signal applied to the I/O terminal during at least one read period, the method comprising:

setting the I/O terminal to the input configuration allowing the controller to read the signal applied to the I/O terminal during the read period; and setting the I/O terminal to the output configuration to provide a signal to the I/O terminal after the read period.

21. The method of claim 20 and further comprising: setting the I/O terminal to the output configuration until the read period.

22. The method of claim 21 wherein the step of setting the I/O terminal to the input configuration comprises:

disabling an output stage connected to the I/O terminal.

23. The method of claim 21 wherein the step of setting the I/O terminal to the output configuration comprises:

enabling an output stage connected to the I/O terminal.

24. The method of claim 23 wherein the step of enabling an output stage comprises:

configuring the output stage to drive a logic low level.

25. A heating control system for controller a heating system, comprising:

a controller for monitoring an input signal at a controller terminal of the controller and for controlling the heating system based on the input signal, the controller terminal being coupled for bi-directional operation;

means for setting the controller terminal to an input configuration allowing the controller to monitor the input signal; and means for setting the controller terminal to an output configuration, allowing the controller to provide an output signal at the output terminal at least a portion of the time that the controller is not monitoring the input signal.

26. The heating control system of claim 25 and further comprising:

means for periodically setting the controller terminal to the input configuration allowing the controller to monitor the input signal during a plurality of monitor periods; and means for setting the controller terminal to the output configuration other than during the monitor periods.

27. The heating control system of claim 25 wherein the controller terminal comprises:

an input/output (I/O) terminal of the controller having an input stage and an output stage connected thereto.

28. The heating control system of claim 27 wherein the means for setting the controller terminal to an output configuration comprises:

means for turning on the output stage.

29. The heating control system of claim 28 wherein the means for turning on the output stage comprises:

means for setting the output stage to drive a logic low output signal at the I/O terminal.

30. A heating control system for controlling a heating system, the heating control system comprising:

a controller for reading a signal at a controller terminal at least once and for controlling the heating system based on the signal, wherein the controller terminal is coupled for bi-directional operation having an input configuration for receiving and reading the signal at the controller terminal, and an output configuration for providing an output signal at the controller terminal;

means for setting the controller terminal to the input configuration for an input duration allowing the signal to be read by the controller at the controller terminal; and means for setting the controller terminal to the output configuration after the input duration.

31. The heating control system of claim 30 and further comprising:

means for repeatedly setting the controller terminal to the input configuration allowing the controller to repeatedly read the signal; and means for repeatedly setting the controller terminal to the output configuration.

32. The heating control system of claim 30 wherein the controller terminal comprises:

an input/output (I/O) terminal of the controller having an input stage and an output stage connected thereto.

33. The heating control system of claim 32 wherein the means for setting the controller terminal to an output configuration comprises:

means for turning on the output stage.

34. The heating control system of claim 33 wherein the means for turning on the output stage comprises:

means for setting the output stage to drive a logic low output signal at the I/O terminal.

35. The heating control system of claim 33 wherein the output stage comprises:

a transistor coupled between the controller terminal and a reference voltage.

36. The heating control system of claim 35 wherein the step of turning on the output stage comprises:

turning on the transistor.

37. A heating control system for controlling a heating system to provide input protection, the heating control system comprising:

a controller for monitoring a controller terminal for at least one monitor period, the controller terminal being coupled to a bi-directional gate configurable by the controller in an input configuration for receiving a signal applied at the controller terminal allowing the controller to read the signal and control the heating system based on the signal, and an output configuration allowing the controller terminal to provide a signal at the controller terminal; and means for setting the bi-directional gate to an output configuration for at least a portion of the time other than during the monitor period.

38. The heating control system of claim 37 and further comprising:

means for setting the bi-directional gate to the input configuration during each of a plurality of monitor periods allowing the controller to monitor the controller terminal; and means for setting the bi-directional gate to the output configuration between the monitor periods.

39. The heating control system of claim 38 wherein the controller terminal comprises an input/output (I/O) terminal of the controller and the bi-directional gate comprises an input stage and an output stage and wherein the means for setting the bi-directional gate to an output configuration comprises:

means for turning on the output stage.

40. The heating control system of claim 39 wherein the means for turning on the output stage comprises:
means for setting the output stage to drive a logic low output signal at the I/O terminal.

41. A heating control system for controlling a heating system, the heating control system comprising:
a controller;
a controller terminal coupled to the controller, said controller monitoring an input signal at said controller terminal wherein the controller terminal is not monitored by the controller for at least one input protection period, and wherein the controller terminal is coupled for bi-directional operation and settable by the controller to an input configuration wherein the controller receives an input signal applied to the controller terminal, and an output configuration wherein the controller provides an output signal at the controller terminal; and
means for setting the controller terminal to the output configuration during the input protection period.

42. The heating control system of claim 41 and further comprising:
means for setting the controller terminal to the input configuration allowing the controller to monitor the controller terminal.

43. The heating control system of claim 41 wherein the controller terminal comprises:
an input/output (I/O) terminal of the controller having an input stage and an output stage connected thereto.

44. The heating control system of claim 43 wherein the means for setting the controller terminal to the output configuration comprises:
means for turning on the output stage.

45. The heating control system of claim 44 wherein the means for turning on the output stage comprises:
means for setting the output stage to drive a logic low output signal at the I/O terminal.

46. An apparatus for providing protection in a system having a controller and a controller terminal coupled to the controller said controller monitoring an input signal at said controller terminal, comprising:
a transistor coupled between the controller terminal and a reference voltage; and
means, coupled to the transistor, for turning on the transistor for an input protection period, the input protection period being at least a portion of the time that the controller is not monitoring the controller terminal.

47. The apparatus of claim 46 and further comprising:
a protection circuit coupled to the controller terminal.

48. A heating control system, comprising:
a heating system controller for monitoring at least one system signal at a controller terminal, the system signal representing a heating system parameter and the controller monitoring the system signal for at least one monitor period, the controller terminal being coupled for bi-directional operation and being settable by the controller to an input configuration for receiving the system signal and allowing the controller to monitor the system signal, and an output configuration allowing the controller to provide an output signal at the controller terminal; and
means for setting the controller terminal to the output configuration for at least a portion of the time other than during the monitor period.

49. The heating control system of claim 48 and further comprising:
means for setting the controller terminal to the input configuration during each of a plurality of monitor periods allowing the controller to monitor the system signal; and
means for setting the controller terminal to the output configuration between the monitor periods.

50. The heating control system of claim 48 wherein the controller terminal comprises an input/output (I/O) terminal of the controller, having an input stage and an output stage connected thereto, and wherein the means for setting the controller terminal to the output configuration comprises:
means for turning on the output stage connected to the I/O terminal.

51. The heating control system of claim 50 wherein the means for turning on the output stage comprises:
means for setting the output stage to drive a logic low output signal at the I/O terminal.

52. The heating control system of claim 50 wherein the output stage further comprises:
a transisor coupled between the I/O terminal and a reference voltage.

53. The heating control system of claim 52 wherein the means for turning on the output stage comprises:
means for turning on the transistor.

54. The heating control system of claim 53 wherein the reference voltage comprises a voltage level enabling the transistor to drive a logic low output signal at the I/O terminal when the transistor is turned on.

55. The heating control system of claim 54 wherein the system signal comprises:
an AC signal wherein the controller verifies the presence of the AC signal by monitoring the AC signal once each half cycle of the AC signal.

56. The heating control system of claim 55 wherein the means turning on the transistor turns on the transistor during periods other than when the controller is monitoring the AC signal.

* * * * *

UNITED STATES PATENT AND TRADEMARK OFFICE
CERTIFICATE OF CORRECTION

PATENT NO. : 5,324,915
DATED : June 28, 1994
INVENTOR(S) : JOHN T. ADAMS, T. MICHAEL TINSLEY It is certified that error appears in the above-indentified patent and that said Letters Patent is hereby corrected as shown below:

Col. 2, line 11, after "circuit", insert --in the--

Col. 2, line 51, after "discharge", insert --.--

Col. 6, line 29, delete configuration", insert --configuring--

Col. 10, line 38, delete "transisor", insert --transistor--

Signed and Sealed this

Twenty-ninth Day of November, 1994

Attest:

BRUCE LEHMAN

*Attesting Officer*    *Commissioner of Patents and Trademarks*